July 31, 1962 F. T. SMITH 3,046,950
CONSTANT MECHANICAL ADVANTAGE ROTARY HYDRAULIC DEVICE
Filed Jan. 22, 1958 5 Sheets-Sheet 1

INVENTOR.
Fred T. Smith,
BY
Mann Brown + McWilliams
Attys

July 31, 1962  F. T. SMITH  3,046,950
CONSTANT MECHANICAL ADVANTAGE ROTARY HYDRAULIC DEVICE
Filed Jan. 22, 1958  5 Sheets-Sheet 3

INVENTOR.
Fred T. Smith,
BY
Mann, Brown + McWilliams
attys

_United States Patent Office_

3,046,950
Patented July 31, 1962

3,046,950
CONSTANT MECHANICAL ADVANTAGE ROTARY
HYDRAULIC DEVICE
Fred T. Smith, Olympia Fields, Ill., assignor to Whiting
Corporation, a corporation of Illinois
Filed Jan. 22, 1958, Ser. No. 710,452
3 Claims. (Cl. 121—121)

My invention relates to a constant mechanical advantage rotary hydraulic device operable either as a motor or as a pump, and more particularly, to a positive displacement rotary hydraulic device that includes pistons having their strokes controlled by a cam surface in such a manner that the output of the device, whether acting as a pump or as a motor, is uniform or constant, rather than pulsating in nature.

One of the prominent characteristics of conventional piston type hydraulic motors and pumps is that they produce a pulsating output. Thus, hydraulic motors conventionally supply a pulsating torque output, while hydraulic pumps produce a pulsating liquid discharge.

Hydraulic devices of this type conventionally comprise a sliding block type linkage including a crank shaft rotated by, or rotated to actuate, a plurality of pistons reciprocating in cylinders that may be arranged in line or radially about the crank shaft. The pistons are connected to the shaft by piston rods and crank arms. If the hydraulic liquid is the driving agency, it acts against the pistons which in turn apply torque to the shaft to rotate same to provide power. If the pistons are the driving agency, they are reciprocated by rotating the shaft, which actuates them through their respective piston rods and crank arms; the pistons then perform work on the liquid and act as a pump.

In either case, the conversion between rotary and reciprocating movement in sliding block linkages means that each piston will necessarily come to a complete stop at two particular positions of the crank shaft before the direction of its motion is reversed, and its rectilinear speed is at a maximum midway between these two crank shaft positions. Since the rate of piston movement along its cylinder is equivalent to the rate of displacement of the cylinder in which it is mounted, the displacement, and consequently, the displacement or liquid acceptance capacity of each piston and cylinder has the well-known curve (for instance, liquid flow or displacement plotted against degree of crank angle reloution) in which the displacement is at a minimum at the ends of the piston stroke and is at a maximum adjacent the middle of the stroke. This means that over the cycle of operation of the device, whether it operates as a motor or as a pump, liquid discharge is made pulsating in nature by the pistons and cylinders forming a part of the device.

Moreover, the lever arms between the individual pistons and the shaft vary throughout the cycle of operation, and it is common knowledge that the summation of these lever arms over the cycle of operation of devices of this type is in effect a fluctuating mechanical advantage, which means that the force transmitted through hydraulic devices of this type will provide an output that necessarily fluctuates over the cycle of operation of the device. In motors, the latter has the effect of providing a pulsating torque output at the shaft regardless of how carefully hydraulic liquid flow is controlled. Consequently, hydraulic devices of this type heretofore have been limited in application to situations where the adverse effect of the pulsating output is negligible.

My application Serial No. 657,862, filed May 8, 1957, now Patent No. 2,984,222, granted May 16, 1961, the disclosure of which is hereby specifically incorporated by reference, discloses a rotary hydraulic device including a plurality of cylinders and pistons and one or more pistion compensators, in which the output pulsations heretofore characteristic of hydraulic apparatus of this type are eliminated, whether the hydraulic device operates either as a motor or as a pump.

A principal object of the present invention is to provide a rotary hydraulic device including pistons and cylinders in which the customary output pulsations are eliminated without requiring pulsation compensators as such.

A further principal object of the invention is to provide a rotary hydraulic device that operates through a constant mechanical advantage throughout its cycle of operation regardless of whether its serves as a motor or as a pump, and regardless of whether it operates in a forward or reverse direction.

Still a further principal object of my invention is to provide a simplified constant mechanical advantage rotary hydraulic motor, and hydraulic circuits for operating same, to provide a uniform or constant, rather than a pulsating angular torque output.

Another object of the invention is to provide a positive displacement hydraulic device in which the total hydraulic liquid receiving capacity or displacement of the unit is made predetermined and uniform for each cycle, and portion of a cycle, of the device.

Yet another object of the invention is to provide a hydraulic drive unit capable of providing a constant or uniform angular torque output over each cycle, and portion of a cycle, of operation of the device.

Another and further object of my invention is to provide a motor or drive unit having stepless speed control and capable of producing, without pulsation, a very high torque at low speeds.

Still another object of my invention is to provide a motor or drive unit that will produce both constant or uniform torque and speed, and also provide stepless speed control without altering the torque provided.

Yet a further object of the invention is to provide a method of completely eliminating output pulsations in positive displacement hydraulic pumps and motors.

Still another object of the invention is to provide a hydraulic device having the foregoing characteristics which is composed of few and simple parts, which is inexpensive of manufacture, and which is adapted for use in a wide variety of applications.

Other objects, uses, and advantages will be obvious or become apparent from a consideration of the following detailed description and the appended drawings.

*General Description*

Figures 1, 1A, 1B, 1C:
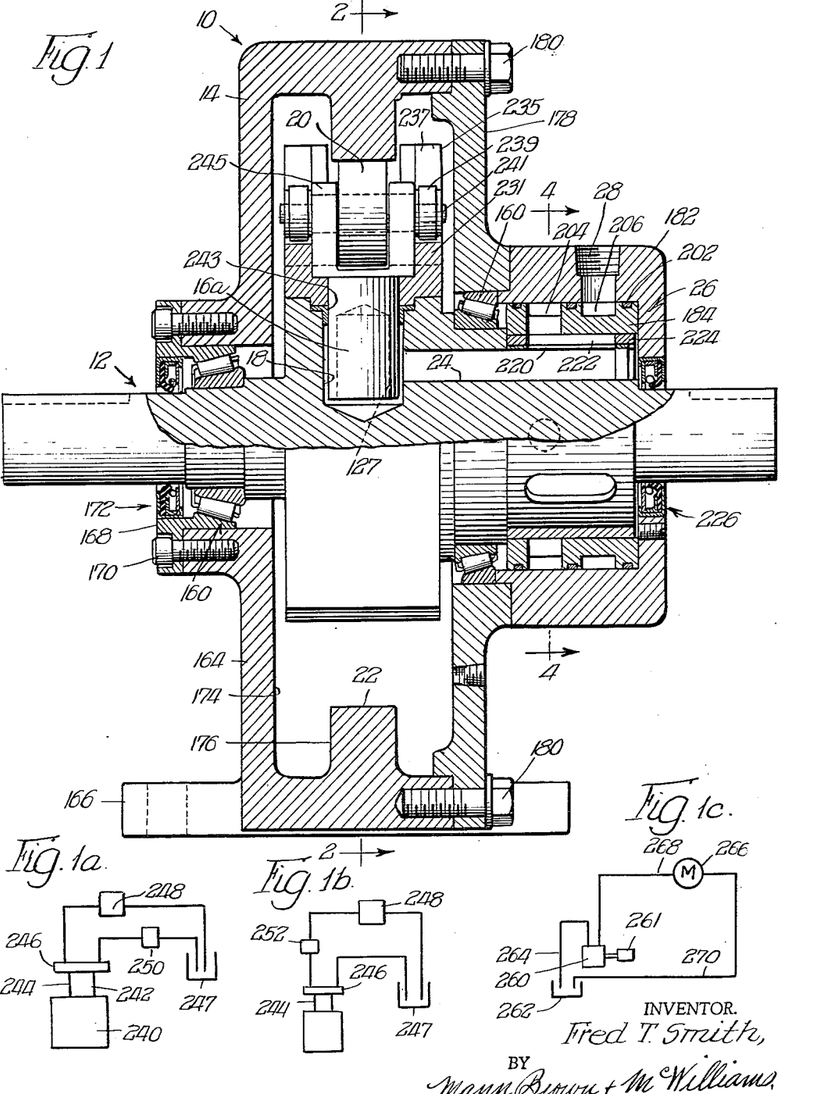
FIGURE 1 is a cross-sectional view through a specific embodiment of the invention that employs a rotatable drive shaft, and with the view being along the drive shaft thereof, the drive shaft being partially shown in elevation.
FIGURES 1a and 1b diagrammatically illustrate hydraulic circuits for operating the device of FIGURE 1 as a motor.
FIGURE 1c diagrammatically illustrates a hydraulic circuit for operating the device of FIGURE 1, when appropriately modified, as a pump.
Figure 2:
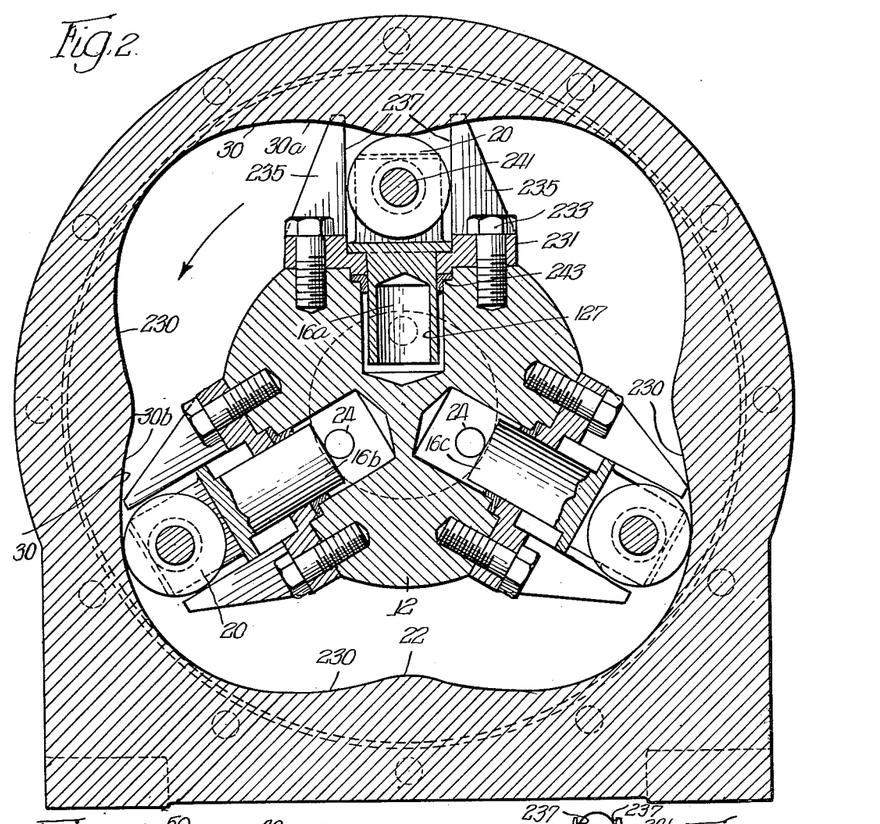
FIGURE 2 is a cross-sectional view along line 2—2 of FIGURE 1.
Figure 4:
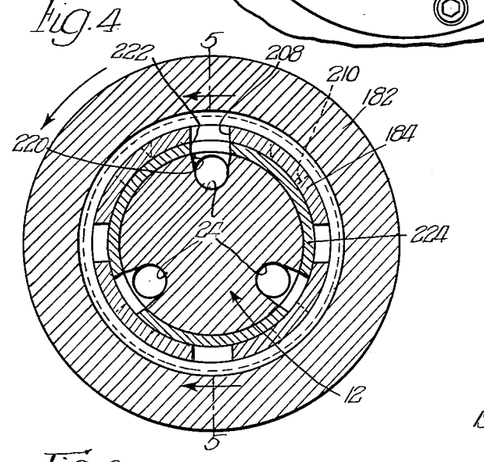
FIGURE 4 is a cross-sectional view along line 4—4 of FIGURE 1.

Reference numeral 10 of FIGURES 1 and 2 generally indicates a specific embodiment of the invention in which the principles of my invention have been incorporated. Motor 10 generally comprises a rotating shaft 12 journaled in housing 14. In the embodiment of FIGURE 1, the pistons and cylinders of the device are incorporated in the shaft 12, reference numerals 16a, 16b, and 16c indicating the pistons, which are mounted in bores 18 that comprise the cylinders of the device. Each piston rotatably carries a cam follower roller 20 that engages circumambient cam surface 22 fixed to the housing 14. Shaft 12 is formed with three longitudinally extending feed passages 24 spaced 120 degrees apart (see FIGURE 4) that extend between the three pistons employed in the embodiment of FIGURE 1 and a hydraulic liquid flow orienting valve device generally indicated at 26.

Figure 3:
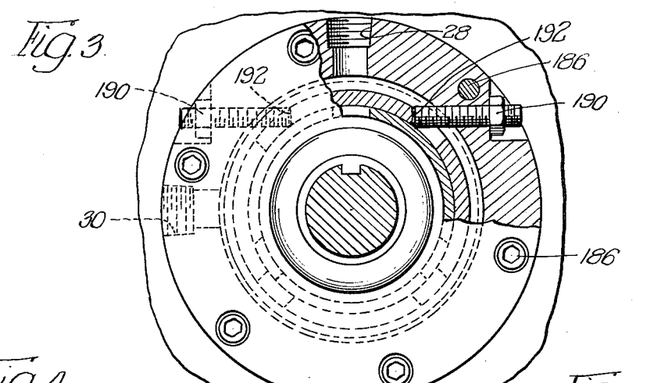
FIGURE 3 is a fragmental elevational view of the device shown in FIGURE 1, taken from the right hand side of the figure, parts being broken away for clarity of illustration.

Hydraulic liquid under pressure is admitted to either port 28 or port 30 (see FIGURE 3) and thence to the valve 26. Valve 26 supplies hydraulic liquid under pressure to the respective feed passages 24, which conduct the pressure liquid to the respective pistons during their power strokes. The respective pistons during their power strokes move outwardly of the shaft under the guiding action of the cam surface 22; the rollers 20 are pressed against portions 30 (see FIGURE 2) of the cam surface 22 during the power strokes of the piston, and consequently, the shaft 12 turns, for instance, in the direction of the arrow of FIGURE 2.

In accordance with conventional practices, the hydraulic liquid under pressure applies torque to shaft 12 through a varying mechanical advantage over the cycle of operation of the device, but in accordance with my invention, the mechanical advantage that the hydraulic liquid acts through is made constant in the manner about to be described.

Figure 2A:
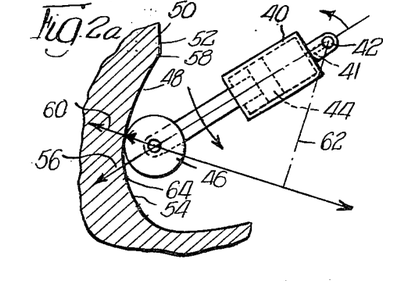
FIGURE 2a is a diagrammatic view illustrating in outline form a cylinder, a piston reciprocably mounted in the cylinder, and a portion of a more or less conventional cam surface, and is provided for the purpose of better outlining the principles of my invention.

Referring to FIGURE 2a, which diagrammatically illustrates a cylinder 40 fixed to rotating shaft 42 and containing a piston 44 carrying roller 46 that bears against surface portion 48 of a fixed cam surface 50, if hydraulic liquid under pressure is admitted to cylinder 40 behind piston 44 (through, for instance, diagrammatically illustrated inlet 41 that is connected to an appropriate feed passage in shaft 42 through which hydraulic liquid passes under the control of appropriate valving) and roller 46 is in contact with concave circular surfaces 52 and 54 (which form points of dwell for valve changes and the like), the thrust applied to the piston by the hydraulic liquid acts solely in the direction of arrow 56 with respect to the axis of the piston, and thus no sidewise thrust is applied to the roller 46 or its piston 44. Therefore, zero torque is applied to shaft 42 through piston 44. However, when roller 46 reaches the point 58 on curved portion 48 and moves along curved portion 48 toward dwell portion 54, the roller 46 engages the cam surface at an angle with respect to the axis of piston 54. In the position shown, the force applied to the surface 48 by piston 44 through roller 46 acts in the direction of arrow 60 and thus a reactance force acts on shaft 42 through a lever arm 62; since it is assumed that cam surface 50 is fixed, torque is applied to shaft 42 which tends to rotate same.

When roller 46 moves between points 58 and 64 of the cam surface 50 (the beginning of dwell surface 54), the piston 44 starts its power stroke and moves from zero velocity to maximum velocity and then back to zero velocity as it approaches point 64. This is because the piston changes directions at the end of its power stroke and moves to the right of FIGURE 2a (with respect to cylinder 40) for its exhaust stroke.

Of course, as roller 46 moves along surface portion 48 between points 58 and 64, the lever arm 62 varies from zero to a maximum and then back to zero as the line contact between surface portion 48 and roller 46 changes with respect to the axis of the piston 44. In conventional apparatus, this varying lever arm is one of the causes for the aforementioned pulsating shaft output.

In accordance with my invention, cam surface portion 48, which is indicated at 30 in FIGURE 2 is formed so that the lever arm 62 will be constant for a great portion of the power stroke of piston 44; moreover, the various cam surface portions 30 are positionally related with respect to the pistons 16a, 16b, and 16c so that at the beginning and end of each power stroke of a piston (say piston 16a), the lever arm that the reactance force provided by the piston 16a acts through is blendingly and compensatingly related to the lever arms that the reactance forces provided by the adjacent pistons (in the cycle of operation) act through with the result that the effective lever arm which the hydraulic liquid acts through on the shaft 12 is maintained constant.

Thus, in the showing of FIGURE 2, piston 16a is about to start its power stroke while piston 16b is nearing the end of its power stroke. As the roller 20 of piston 16a moves down surface 30a, the lever arm that the reactance force provided by piston 16a acts through varies at a predetermined rate from zero to a predetermined maximum while at the same time roller 20 of piston 16b is moving down surface 30b, and the lever arm that the reactance force provided by piston 16b acts through decreases from a predetermined maximum to zero at the same rate that the lever arm of piston 16a increases from zero to the predetermined maximum.

Referring again to FIGURE 2a, as the rate of change in length of lever arm 62 and the displacement rate of piston 44 over its power stroke are directly proportional, by controlling the displacement rate of the piston, the length of lever arm 62 is controlled. In accordance with my invention, the displacement rates and consequently the velocities of pistons 16a, 16b, and 16c are controlled, to control the lever arms 62, and are made constant over a great portion of the power strokes of the pistons. Moreover, the strokes of these pistons are so timed that at the beginning and end of the power stroke of each piston, another piston velocity, during the power stroke thereof, is changing at the same rate, though in inverse relation, so that the mechanical advantage of the motor is made constant as described above.

Figures 8, 8A:
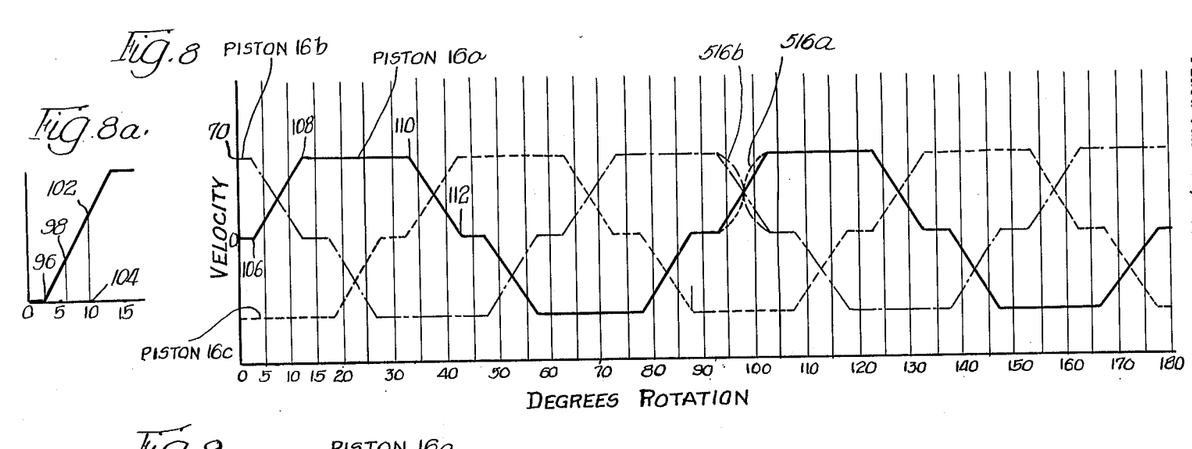
FIGURE 8 is a hydraulic piston velocity graph employed in developing the controlling cam surface forming a part of the embodiment of FIGURE 1.
FIGURE 8a is an enlarged fragment of the graph of FIGURE 8.
Figure 9:
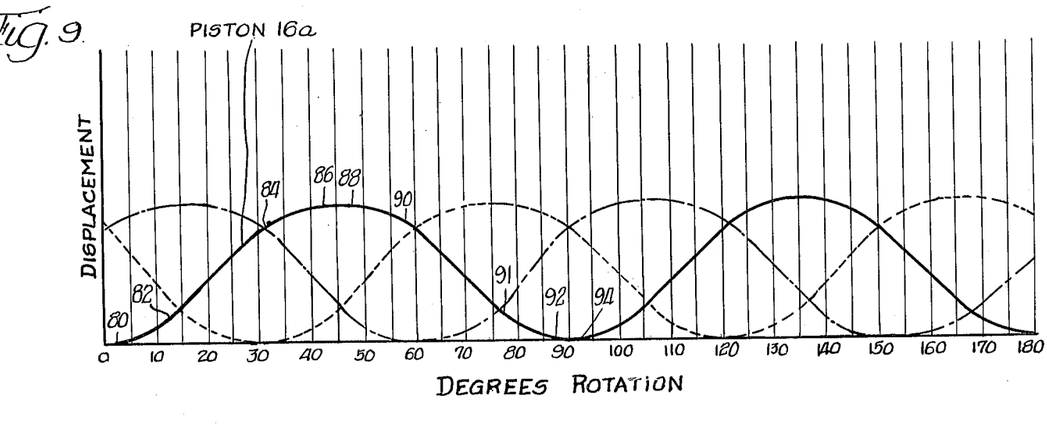
FIGURE 9 is a piston displacement graph that is derived from the graph of FIGURE 8 and employed in developing the cam surface forming the part of the embodiment of FIGURE 1.

The relationship between the velocities of the respective pistons and the timing of the piston movement is indicated in the graph of FIGURE 8, while the graph of FIGURE 9 indicates the cam curves required for proper displacement rates in accordance with this invention, and the relationship and timing required in establishing a cycle of operation for the motor 10.

Referring to FIGURE 8, in which piston velocity is plotted against degrees of rotation of the shaft 12, and the solid line curve indicates the velocity curve of piston 16a, the broken line curve indicates the velocity curve of piston 16b, and the dashed curve indicates the velocity of piston 16c, piston 16a at 2½ degrees commences its power stroke and its velocity changes from zero to a predetermined maximum, the selected maximum being the abscissa line indicated by point 70 on graph 8. As the shaft rotates between 12½ degrees and 32½ degrees, the piston 16a moves at a constant velocity; at 32½ degrees, the velocity of the piston decreases from the predetermined maximum to zero for a period of dwell, zero velocity being reached in the graph of FIGURE 8 at 42½ degrees. After the period of dwell (five degrees in the illustrated embodiment), the piston is moved through a return or exhaust stroke, which is preferably and conveniently symmetrically related to the power stroke movements.

In the meantime, the other two pistons of the illustrated embodiment are going through like cycles. However, these cycles are sufficiently out of phase with each other and so positionally related that during the period when the velocity of one of the pistons, for instance, piston 16a is changing between zero and the predetermined maximum, or between the predetermined maximum and zero, other pistons are participating in the application of torque to the shaft to the extent of the amount required to make up for or equalize the changes in torque occurring during the power stroke of piston 16a at the beginning and the end of the stroke.

Thus, piston 16b, in the illustrated embodiment, at 2½ degrees commences losing velocity at the same rate that piston 16a gains velocity, and this continues until piston 16a has reached the predetermined maximum velocity and piston 16b has zero velocity.

When piston 16a reaches 32½ degrees of crank shaft rotation, piston 16c commences its power stroke and gains velocity at the same rate that piston 16a loses velocity until piston 16c reaches the maximum predetermined velocity and piston 16a has zero velocity.

At 62½ degrees of crank angle, piston 16b has completed its exhaust stroke as well as the dwell period and is positioned to start its power stroke. As piston 16c loses velocity, piston 16b gains velocity at the same rate until the velocity of piston 16b is at the predetermined maximum velocity, and the velocity of piston 16c is zero.

The movement of the pistons and their power and return strokes are thus controlled and related over the cycle of operation of the motor 10 so that in effect the hydraulic pressure liquid applies force to the shaft 12 through a constant effective lever arm.

The specific cam surface, such as cam surface 22, required to provide the above indicated piston velocities may be obtained in any suitable manner from, for instance, a graph such as that shown in FIGURE 8. Of course, when the velocity, or displacement rate, of a piston is to be constant, the cam surface segment required to provide such displacement will be a straight line on the graph of FIGURE 9. As the piston velocities at the beginning and ends of the piston power strokes are uniformly accelerating and decelerating, as indicated by the graph of FIGURE 8, the cam curves required to provide these changing rates of displacement will be uniform acceleration and deceleration curves on the graph of FIGURE 9.

Referring to FIGURE 9, wherein the solid line curve illustrates the cam surface required to reciprocate piston 16a in accordance with my invention, the uniform acceleration portion of the power stroke of piston 16a lies between points 80 and 82, while the uniform deceleration portion of the stroke lies beteween points 84 and 86. The portion of the power stroke lying between points 82 and 84 is the uniform velocity portion of the stroke. On the exhaust stroke of piston 16a, which begins at point 88 of the solid line curve, the uniform acceleration portion of the exhaust stroke is between points 88 and 90 of the solid line curve, while the uniform deceleration portion of the exhaust stroke appears between points 91 and 92. Of course, the portion of the solid line curve between points 90 and 91 indicates uniform velocity. After 5 degrees of dwell, piston 16a commences a new power stroke at point 94.

The curves for pistons 16b and 16c include the same portions, though these curves are out of phase with the solid line curve the amounts indicated by the curves of FIGURE 8.

The uniform acceleration and deceleration curves may be plotted by following a course of action indicated in FIGURE 8a. By taking the differences in area of successive triangles, such as the triangles between points 96, 98, and 100, and between points 96, 102, and 104, the uniform acceleration and deceleration curves may be plotted in FIGURE 9. Thus, the portion of the solid line curve between points 80 and 82 is a uniform acceleration curve which represents the rate of change of area under the portion of the solid line curve in FIGURE 8 between points 106 and 108; likewise, the portion of the solid line curve in FIGURE 9 between points 84 and 86 represents the rate of change of area under the solid line curve of FIGURE 8 between points 110 and 112.

The remainder of the solid line curve may be similarly plotted for 360 degrees, as may the curves for pistons 16b and 16c. In practice, conventional devices for measuring areas on graphs may be employed to facilitate the establishment of the curves of FIGURE 9.

After the curves of FIGURE 9 are obtained, they may be incorporated in a single cam surface 22 in any conventional manner. It will be noted that the curves are 30 degrees out of phase with each other, and that each completes a cycle in 90 degrees of shaft rotation. Thus, in the embodiment of FIGURE 1, each of the pistons 16a, 16b, and 16c will make four power strokes over the cycle of operation of motor 10.

The motor 10 when provided with cam surface 22 and operated in accordance with my governing formula or expression set forth in my said copending application will provide a uniform angular torque output whether operating in forward or reverse direction.

Moreover, the device 10 may be operated as a pump by merely employing springs 120 (see FIGURE 2b) or their equivalent between the inner ends of bores 18 and the inner ends of pistons 16. Pistons 16a, 16b, and 16c are recessed as at 127 to receive springs 120. Alternately, the feed liquid for the pump may be under sufficient pressure to keep the piston rollers in contact with the cam surface 22; this may be done in any suitable manner, and eliminates the need for springs 120. When operating as a pump, the device will provide a uniform or constant displacement or liquid discharge, since the rate of displacement of the pistons as a whole is made constant by employing the curves of FIGURE 9 in cam surface 22.

Figures 10, 11, 12:
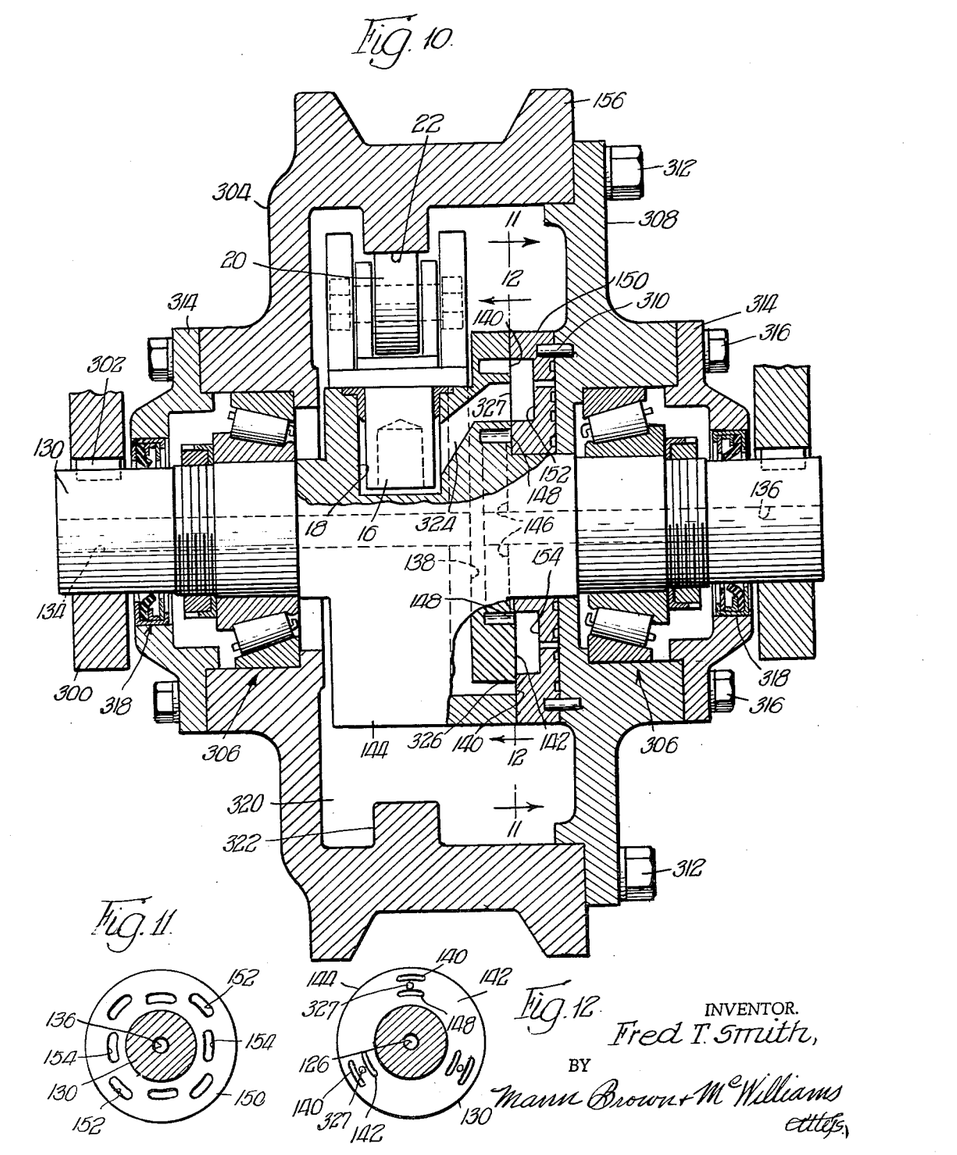
FIGURE 10 is a cross-sectional view through a fixed shaft type of hydraulic motor employing the principles of my invention.
FIGURE 11 is a diagrammatic cross-sectional view along line 11—11 of FIGURE 10.
FIGURE 12 is a diagrammatic cross-sectional view along line 12—12 of FIGURE 10.

The principles of my invention are not limited to rotatable shaft devices as will be seen by referring to FIGURE 10, which illustrates a fixed shaft 130 provided with bores 18 in which pistons 16 are respectively reciprocally mounted. Pistons 16 carry cam rollers 20 that engage cam surface 22 which is identical to surface 22 of FIGURE 2. Fixed shaft 130 is provided with axially extending intake feed passage 134 and axially extending exhaust feed passage 136, the functions of which may be reversed to run the motor in the opposite direction. Intake passage 134 leads to spaced feed passages 138 which terminate in ports 140 formed in the face 142 of shaft enlargement 144. Exhaust passage 136 is in communication with spaced passages 146 that terminate in ports 148 formed in shaft face 142. A valve plate 150 is provided with appropriately spaced recesses 152 and 154 for controlling the admittance and exhaust of hydraulic liquid under pressure to and from the bores 18 of the device of FIGURE 10.

A flanged wheel 156 is journalled on shaft 130 in any suitable manner and cam surface 22 is integrally formed about the internal surface of the wheel. Valve plate 150 is keyed to wheel 156.

Thus, when hydraulic liquid under pressure is supplied to, for instance, passage 134, wheel 156 rotates with respect to the shaft under the action of pistons 16 that are mounted in shaft 130. When cam surface 22 of the embodiments of FIGURE 10 is arranged in accordance with my invention, and in a manner similar to cam surface 22 of FIGURE 2, the hydraulic liquid acts on wheel 156 through a constant effective mechanical advantage; when the device of FIGURE 10 is operated in accordance with my governing formula or expression of my said copending application, it will provide a uniform angular torque output.

*Specific Description*

Referring again to the embodiment of FIGURES 1 and 2, the shaft 12 of motor 10 is journalled in appropriate roller bearings generally indicated at 160. Motor housing 14 comprises main housing member 164 that includes a flat base 166, and to which bearing retainer plate 168 is secured as by appropriate bolts 170. A conventional type of oil seal may be interposed between plate 168 and shaft 12 where generally indicated at 172. The housing 164 is formed with a generally rounded chamber 174 into which a centrally disposed flange 176 projects on which cam surface 22 is developed. The chamber 174 is closed by a housing cover plate 178 secured in place by appropriate bolts 180. Secured to cover plate 178 is a housing for valve 126 including housing portion 182 in which is mounted valve member 184; housing member 182 is secured to cover plate 178 by appropriate bolts 186 (see FIGURE 3), and valve member 184 is held in stationary position by oppositely directed bolts 190 that are received in housing member 182 and bear against the flat surfaces 192 formed in the valve member.

Figure 5:
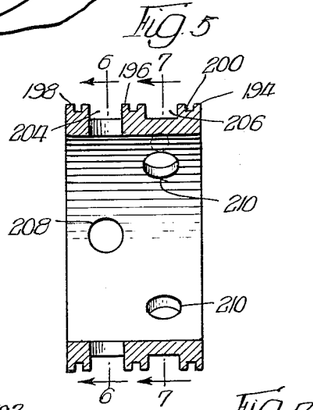
FIGURE 5 is a cross-sectional view of a valve employed in the embodiment of FIGURE 1, taken along line 5—5 of FIGURE 4.
Figure 6:
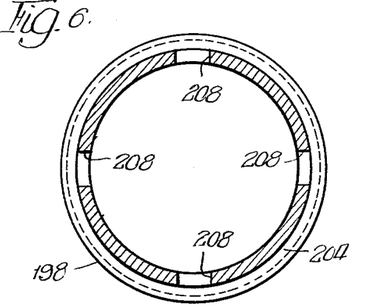
FIGURE 6 is a cross-sectional view along line 6—6 of FIGURE 5.
Figure 7:
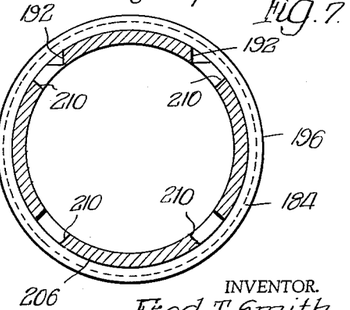
FIGURE 7 is a cross-sectional view along line 7—7 of FIGURE 5.

As indicated in FIGURES 5 through 7, the valve member 184 comprises a generally cylindrical element formed with spaced cylindrical ribs 194, 196, and 198 which are in turn provided with circular grooves 200. As indicated in FIGURE 1, O-ring seals 202 are received in each of the grooves 200 to provide the necesary oil sealing action.

The spaced ridges 194, 196, and 198 form spaced pooling areas 204 and 206, which respectively communicate with ports 208 and 210 formed about the body of member 184. The pooling area 204 is placed in communication with port 30, and the pooling area 206 is placed in communication with port 28 when the valve member 184 is positioned as shown in FIGURE 1. As either port 28 or port 30 may be the inlet port for the motor 10, the areas 200 and 206 may be either an inlet pooling area or an exhaust pooling area.

For purposes of facilitating the description, it will be assumed that port 28 is the inlet port of the motor, and that when this is the case, the shaft 12 rotates in the direction of the arrow in FIGURE 2.

Ports 208 and 210 of valve member 184 are positioned about the valve member in the relationship indicated in FIGURES 6 and 7 to control and orient the hydraulic liquid flow in accordance with the power and exhaust strokes required by the graphs of FIGURES 8 and 9.

The feed passages 24 of shaft 12 terminate in elongated ports 220, which are aligned with similar openings 222 formed in valve bushing 224 that is carried by shaft 12, and which rotates with respect to shaft 12. The valve housing portion 182 may include an appropriate oil seal where generally indicated at 226 (see FIGURE 1).

When hydraulic liquid under pressure is supplied to inlet port 28, it accumulates about pooling area 206 and thus is made readily available at ports 210. When ports 220 of shaft 12 become aligned with ports 210, hydraulic liquid under pressure is admitted to the bores 18 of the shaft, and the pistons making their power strokes are forced outwardly of the shaft against the cam surface 22. After a piston completes its power stroke, it passes through a period of dwell and then commences its exhaust stroke in which the portions 230 of cam surface 22 (see FIGURE 2) force the piston inwardly against the hydraulic liquid, thus exhausting same from the bore 18, through a passage 24 and port 220, ports 208 of valve member 184 and thence through pooling area 204 and exhaust port 30.

If port 30 is made the intake port, the operation is reversed, as is the direction of rotation of the motor.

The shaft 12 carries a four armed bracket 231 about the outer end of each bore 18, brackets 231 being held in place by appropriate bolts 233. The arms 235 of the respective brackets are arranged in pairs that are provided with opposing guide surfaces 237 between which ride guide rollers 239 that are rotatably mounted on the pin 241 of each piston that rotatably secures cam roller 20 of the piston in place. Pins 241 are received in ears 245 of the respective pistons. An appropriate oil seal 243 may be inserted under each bracket 231.

Figure 1a illustrates an appropriate hydraulic circuit for operating motor 10. Reference numeral 240 indicates a motor of the type shown in FIGURE 1, which is connected by lines 242 and 244 to four-way control valve 246 of any appropriate type. Hydraulic liquid under pressure is supplied to valve 246 from tank 247 by an appropriate pump 248, while a hydraulic liquid volume control valve 250 is interposed in the return line of the system.

FIGURE 1b illustrates a different form of hydraulic circuit in which a pressure regulating valve 252 is interposed between pump 248 and the four-way control valve 246, and the volume control valve is omitted from the return side of the system.

Reference may be had to my patent No. 2,984,222 for a complete description of suitable valves 246, 250 and 252 appropriate for use as described above.

The circuits illustrated in FIGURES 1a and 1b are in accordance with the governing expression set forth in by said copending application. The reasons behind the governing expression are briefly set forth below.

The angular torque output $T_0$ of the shaft 12 at any instant is equivalent to the expression $T_1-T_2$, wherein $T_1$ is the torque applied to the shaft by the pressure side of the hydraulic system while $T_2$ is the countertorque applied to the shaft by the back pressure in the exhaust side of the system. Since torque is equal to force times a lever arm, and mechanical advantage is functionally a "lever arm" $T_1-T_2=F_1A_1-F_2A_2$, wherein $F_1$ is the total intake side force provided by the driving hydraulic liquid acting on the pistons of cylinders 12, $A_1$ is the summation of the mechanical advantages through which the pistons 16 act through at that instant in applying torque to the shaft 12, $F_2$ is the total counterforce opposing movement of the pistons (provided by the back pressure on the discharge side of the hydraulic system), and $A_2$ is the summation of the mechanical advantages through which $F_2$ acts in applying torque to the shaft 12.

As disclosed in my said copending application, I have found that the shaft torque output $T_0$ may be made constant over the cycle of operation of the device by holding at least one of the factors $A_1$ or $A_2$ constant and controlling the values of $F_1$ and $F_2$ over the cycle of operation of the device, thus providing the following governing expression:

$$T_0 = C = F_1A_1 - F_2A_2$$

In the circuit of FIGURE 1a, which is applicable to conditions wherein it is desirable not to have a liquid control valve between pump 248 and motor 240, as where overrunning load conditions exist, or absolute speed control is desired, the valve 250 is provided on the discharge side of the circuit to make volume flow constant or uniform through the hydraulic system. Since pump 248 is assumed not to be a constant pressure pump, $F_1$ of my governing expression will vary, while $A_1$ will be constant since cam surface 22 insures that the mechanical advantage which the hydraulic pressure liquid acts through on shaft 12 is constant; of course, the mechanical advantage that the back pressure of the hydraulic system acts through on shaft 12 is also made constant by cam surface 22, and valve 250 being a constant volume valve will vary $F_2$ in proportion to the variations of $F_1$. Thus the torque output provided by the hydraulic system of FIGURE 1a will be in accordance with my governing expression.

In the hydraulic circuit of FIGURE 1b, valve 252 being a pressure regulating valve, it makes $F_1$ constant, and since the discharge pressure of the hydraulic liquid in the return line system is ordinarily constant, the torque output of the hydraulic circuit of FIGURE 1b is in accordance with my governing expression.

Figure 2B:
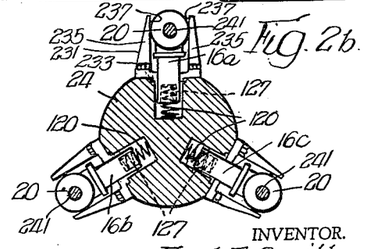
FIGURE 2b is a diagrammatic cross-sectional view through the drive shaft of the embodiment of FIGURE 1, illustrating the manner in which the device of FIGURE 1 may be arranged for pump operation.

FIGURE 1c illustrates a hydraulic circuit in which the motor 10 modified as indicated in FIGURE 2b may be employed as a pump. Reference numeral 260 indicates a pump of this type driven by appropriate motor 261 and which draws hydraulic liquid from tank 262 through intake line 264 and supplies hydraulic liquid under pressure to hydraulic motor 266 (of any conventional design) through pressure line 268. Hydraulic liquid from motor 266 returns to tank 262 by return line 270. In the hydraulic circuit of FIGURE 1c, $F_1$ is assumed to be zero since the device is acting as a pump, and the governing expression becomes $F_2 A_2 = -C$; as the pressure on the discharge side of the pump will be constant, my governing rule is satisfied without control valves.

Referring now to the embodiment of FIGURE 10, shaft 130 may be fixed to stationary supporting plates 300, as by keys 302. Wheel 156 comprises a housing member 304 journalled on shaft 130 as by appropriate bearings generally indicated at 306. Housing 304 includes cover plate 308 to which valve plate 150 is keyed as by pins 310. Cover plate 308 is bolted to member 304 by a plurality of spaced bolts 312.

Housing member 304 and cover plate 308 are provided with end plates 314 secured in place by appropriate bolts 316 and carrying appropriate oil sealing devices 318.

The housing member 304 defines a generally rounded chamber 320 into which flange 322 projects on which cam surface 22 is developed.

Pistons 16 of FIGURE 10 are formed in the same manner and include the same elements as pistons 16a, 16b, and 16c of FIGURE 1. Shaft 130 is formed with a feed passage 324 for each bore 18, which communicates with grooves 152 and 154 formed in the face 326 of valve plate 150. The relationship between ports 140 and 148, grooves or recesses 152 and 154, and passages 324 is indicated in FIGURES 11 and 12, and is such that ports 140 are connected with ports 327 of feed passages 324 through grooves 152 during the power strokes of the pistons 16, while grooves 154 connect ports 148 with ports 327 during the exhaust strokes of the pistons.

The motor of FIGURE 10 may be incorporated in hydraulic circuits such as those shown in FIGURES 1a and 1b as well as any others that conform to my governing rule or expression above discussed. When this is done, the angular torque output of the motor of FIGURE 10 will be uniform or constant.

Also, the device of FIGURE 10, when modified as shown in FIGURE 2b, may be operated as a pump by incorporating it in a circuit such as that shown in FIGURE 1c, the wheel 156 being driven by appropriate belting or gearing.

The motor of FIGURE 10 is particularly adapted for use in driving flanged wheels of vehicles such as trolleys for overhead cranes and the like.

Advantages and Modifications of Invention

One of the principal advantages of hydraulic drives arranged in accordance with my invention is that very high torque outputs may be developed at unusually low speeds without pulsation, thereby permitting improvements in machinery design that were heretofore considered impractical. For instance, gear trains that are conventionally required to transmit power from power units such as electric motors may be completely eliminated, together with the relatively high purchase and installation costs, and instead, a hydraulic motor of the type hereindisclosed may be built directly into the powered member, with considerable saving in space and the elimination of maintenance problems that have consistently plagued industry in the past. In providing a practical form of high torque low speed direct drive device, I have made it possible to do away with many of the mechanical difficulties, such as gearing backlash, that are inherent in conventional mechanical drive transmission systems.

The motors and pumps herein disclosed are adapted for general application. The general arrangement of the hydraulic devices hereindisclosed is such that it is possible to design, for instance, speed and torque drive combinations to meet nearly any drive requirements, and the cylinders being single acting and the valving simplified, they are inexpensive. Though at least two cylinders are required, the invention is applicable to devices employing any number of cylinders over two.

In operation, a device such as that shown in FIGURE 1 running as a motor will provide 2500 inch-pounds of torque at an r.p.m. that is as high as 1000 even though the invention was developed primarily for use at low r.p.m.'s. Moreover, by increasing dimensions, adding further cylinders, and providing additional banks of cylinders, an output of 100,000 inch-pounds is possible.

For instance, the torque output of the illustrated motors as well as all others that come within the scope of the invention may be increased by employing additional cylinders diametrically opposed to those illustrated in the drawings, and by employing banks of cylinders arranged in a manner similar to the single bank of cylinders shown in the illustrated embodiments, each bank having its own cam surface. Thus, in the embodiment of FIGURE 2, the torque output could be doubled without changing the cam configuration or the valving arrangement by adding three more cylinders that are respectively diametrically opposed to those illustrated, together with similar shaft porting. In the showing of FIGURE 8, this would superimpose another curve on each of those illustrated, thus doubling the torque output of the motor.

While in the illustrated embodiments the pistons are forced outwardly of a shaft or other fixed or rotatable member against an encircling cam surface, I contemplate that the cylinders may be arranged about an inner cam surface having a similar configuration to cam surface 22 with equivalent results. The pistons need not be disposed radially of the shaft, but may be positioned so that their axial centers do not pass through the axis of the shaft and the terminology employed in the claims is intended to cover such embodiments; this type of arrangement would be of some benefit for non-reversible motors as the lever arm could be increased for application of torque to the shaft in the desired direction of rotation.

The illustrated embodiments of the invention employ single acting cylinders. However, double acting cylinders may be employed by providing a second cam surface concentrically arranged within the surface 22 and in contact with the radially inner sides of rollers 20, forming the shaft (12 or 130) with appropriate feed passages in communication with both ends of the cylinders, and providing appropriately shaped pistons and cylinders.

The uniform acceleration and deceleration curves employed at the beginning and ends of the power strokes of the pistons are only one example of the types of curves that may be employed. For instance, pistons 16a and 16b could follow curves such as those illustrated at 516a and 516b in FIGURE 8, it only being necessary that the summation of the liquid quantities displaced by the two pistons be equivalent to the selected constant displacement rate of the pistons. Of course, piston 16c would have a similar rate of movement if curves similar to curves 516a and 516b were employed. Generally speaking, any piston movement that will provide a summation of instantaneous displacements that is equivalent to the desired displacement will be satisfactory and comes within the scope of the invention.

The constant piston displacement rate and velocity selected for any particular device will depend upon the structural arrangement of the device and the performance characteristics the designer wishes to achieve. One limitation, of course, if the difficulty in moving large quantities of liquid through devices of this type.

The terms "constant effective displacement cam surface" and "constant effective mechanical advantage cam surface" as used in the appended claims means any cam surface that controls the reciprocation of the hydraulic device pistons over the cycle of operation of the device, and at the rates of movement required, to render the effective displacement and mechanical advantage of the device constant.

The term "blendingly related" as employed in the appended claims with reference to the relationship between the acceleration and decelerations segments of adjacent cam surface power stroke portions means that relationship, with regard to a particular set or bank of pistons, wherein a varying displacement rate of a piston is exactly made up for by a varying displacement rate of a different piston in the set to maintain the constant displacement rate provided by the respective pistons of said set of pistons when they engage the uniform velocity segments of the cam surface.

This application is a continuation-in-part of my application Serial No. 657,862 filed May 8, 1957, now Patent No. 2,984,222, granted May 16, 1961.

The foregoing description and the drawings are given merely to explain and illustrate my invention and the manner in which it may be performed, and the invention is not to be limited thereto, except insofar as the appended claims are so limited, since those skilled in the art who have my disclosure before them will be able to make modifications and variations therein without departing from the scope of the invention.

I claim:

1. Hydraulic motor apparatus comprising a shaft member, a plurality of piston and cylinder assemblies carried by said shaft member in symmetrically arranged relation about the axis thereof, said assemblies each including a piston reciprocably mounted in a cylinder bore formed in said shaft member, a cam member encircling said shaft member, said shaft member being mounted for rotatable movement with respect to said cam member, said cam member being formed with a constant effective mechanical advantage cam surface, a torque transmitting connection between said cam surface and said pistons, said cam surface comprising four symmetrically spaced concave surface portions separated by symmetrically placed connecting surface portions, the first mentioned surface portions each being proportioned to extend about a distance in relation to said shaft member that is on the order of a quadrant thereof, said first mentioned surface portions each including a power stroke section and a return stroke section in that order in the direction of rotation of said shaft member, whereby the rate of displacement of the respective pistons during the power and return strokes thereof is controlled by said cam surface, said power and return stroke sections each including acceleration, uniform velocity, and deceleration segments in that order in the direction of rotation of said shaft member, said acceleration and deceleration segments of said power and return stroke sections being respectively blendingly related about the axis of said shaft member, and said return stroke sections of each of said concave surface portions being symmetrically arranged with respect to said power stroke sections thereof, said pistons each including roller means on one end thereof for rolling engagement with said cam surface and an oppositely disposed inwardly directed hydraulic liquid contacting surface, said shaft member being formed to define a conduit for each of said cylinder bores and extending between the inner end of the respective cylinder bores and a port formed in said shaft member at a point spaced from said bores, said ports being aligned in coplanar relation transversely of said shaft member, an annular valve member received over said shaft member about said ports, said valve member being fixed with respect to said cam member, a housing member received about said valve member, said valve member and said housing member being formed to define annular pooling areas that encircle said shaft member in coplanar relation with said ports, said valve member defining openings that respectively communicate between said pooling areas and said ports, and that are positively related about said pooling areas to define hydraulic liquid supply and return passages corresponding to the positioning of said power and return stroke sections of said cam surface, means for connecting one of said pooling areas to a source of hydraulic liquid under pressure, and means for connecting the other of said pooling areas to hydraulic liquid discharge, said valve member, said ports, said openings, and said pooling areas comprising hydraulic liquid flow orienting means for controlling the flow of hydraulic liquid to and from the respective cylinder bores.

2. Hydraulic motor apparatus comprising a shaft member, a plurality of piston and cylinder assemblies carried by said shaft member in symmetrically arranged relation about the axis thereof, said assemblies each including a piston reciprocably mounted in a cylinder bore formed in said shaft member, a cam member encircling said shaft member, said cam member being mounted for rotatable movement with respect to said shaft member, said cam member being formed with a constant effective mechanical advantage cam surface, a torque transmitting connection between said cam surface and said pistons, said cam surface comprising four symmetrically spaced concave surface portions separated by symmetrically spaced connecting surface portions, the first mentioned surface portions each being proportioned to extend about a distance in relation to said shaft member that is on the order of a quadrant thereof, said first mentioned surface portions each including a power stroke section and a return stroke section in that order in the direction of rotation of said cam member, whereby the rate of displacement of the respective pistons during the power and return strokes thereof is controlled by said cam surface, said power and return stroke sections each including acceleration, uniform velocity, and deceleration segments in that order in the direction of rotation of said cam member, said acceleration and deceleration segments of said power and return stroke sections being respectively blendingly related about the axis of said shaft member, and said return stroke sections of each of said concave surface portions being symmetrically arranged with respect to said power stroke segments, said pistons each including roller means on one end thereof for rolling engagement with said cam surface and an oppositely disposed inwardly directed hydraulic liquid contacting surface, said shaft member being formed adjacent to said bores thereof to define an annular planar surface disposed transversely of the longitudinal axis of said shaft member, said shaft member further defining a first and second longitudinally extending passage and passage branches communicating between ports formed in said surface spaced symmetrically about the axis of said shaft member and at a predetermined distance therefrom, with said ports of one of said passage branches being at a greater distance from said shaft member axis than said ports of said other passage branches, with said respective passage branches and said ports being equal in number to the number of said cylinder bores, and with said ports of said one passage branches being disposed adjacent the respective ports of said other passage branches, said shaft member further including a cylinder bore passage communicating between the respective cylinder bores adjacent the inner ends thereof and a port located between adjacent ports of said one and said other passage branches, and an annular valve member fixed with respect to said shaft member and including a planar surface in contact with said shaft member planar surface, said surface of said valve member being formed with recesses positioned and proportioned to overlie and connect the respective passage branch ports with the respective cylinder bore passage ports as required to admit hydraulic liquid flow to and from said bores under the guiding action of said cam surface, means for securing one of said passages to a source of hydraulic liquid under pressure, and means for securing the other of said passages to hydraulic liquid discharge.

3. The apparatus set forth in claim 2 wherein said cam member is fixed to a wheel defining member.

References Cited in the file of this patent

UNITED STATES PATENTS

| | | |
|---|---|---|
| 717,750 | Johnson | Jan. 6, 1903 |
| 1,070,706 | Luitwieler | Aug. 19, 1913 |
| 1,412,091 | Ricardo | Apr. 11, 1922 |
| 1,418,616 | Boisset | June 6, 1922 |
| 1,485,988 | Michel | Mar. 4, 1924 |
| 1,587,343 | Michel | June 1, 1926 |
| 2,048,524 | Svenson | July 21, 1936 |
| 2,101,829 | Benedek | Dec. 7, 1937 |
| 2,272,684 | Vickers | Feb. 10, 1942 |
| 2,431,176 | Hoffer | Nov. 18, 1947 |
| 2,457,101 | Horton | Dec. 21, 1948 |
| 2,683,421 | Woydt | July 13, 1954 |
| 2,731,919 | Prendergast | Jan. 24, 1956 |
| 2,822,668 | Huse | Feb. 11, 1958 |
| 2,882,831 | Dannevig | Apr. 21, 1959 |

FOREIGN PATENTS

| | | |
|---|---|---|
| 691,793 | France | July 21, 1930 |

UNITED STATES PATENT OFFICE
CERTIFICATE OF CORRECTION

Patent No. 3,046,950

July 31, 1962

Fred T. Smith

It is hereby certified that error appears in the above numbered patent requiring correction and that the said Letters Patent should read as corrected below.

Column 12, lines 25 and 26, for "positively" read -- positionally --.

Signed and sealed this 12th day of February 1963.

(SEAL)
Attest:

ERNEST W. SWIDER
Attesting Officer

DAVID L. LADD
Commissioner of Patents